(12) United States Patent
Koch et al.

(10) Patent No.: US 8,915,820 B2
(45) Date of Patent: Dec. 23, 2014

(54) CONFIGURATION FOR COMPACT FIVE SPEED PLANETARY TRANSMISSION

(75) Inventors: Thomas D. Koch, Green Valley, AZ (US); Justin Floro, East Peoria, IL (US); Michael Gross, Peoria, IL (US); Kevin G. Meyer, Germantown Hills, IL (US); Kevin J. Knox, Peoria, IL (US); James Rice, Deer Creek, IL (US); James Elmer Winzeler, East Peoria, IL (US); Peter H. Hodges, Peoria, IL (US); Perry G. Cruce, Marquette Heights, IL (US)

(73) Assignee: Caterpillar Inc., Peoria, IL (US)

( * ) Notice: Subject to any disclaimer, the term of this patent is extended or adjusted under 35 U.S.C. 154(b) by 205 days.

(21) Appl. No.: 13/567,570

(22) Filed: Aug. 6, 2012

(65) Prior Publication Data

US 2014/0038765 A1   Feb. 6, 2014

(51) Int. Cl.
*F16H 3/62*   (2006.01)

(52) U.S. Cl.
USPC .......................................... 475/276

(58) Field of Classification Search
USPC .................. 475/276, 277, 278, 279
See application file for complete search history.

(56) References Cited

U.S. PATENT DOCUMENTS

| 4,531,428 | A * | 7/1985 | Windish | 475/279 |
| 4,742,733 | A * | 5/1988 | Schreiner | 477/120 |
| 7,963,876 | B2 | 6/2011 | Phillips | |
| 8,088,033 | B2 | 1/2012 | Boss et al. | |
| 8,506,443 | B2 * | 8/2013 | Seo et al. | 475/280 |
| 2014/0004991 | A1 * | 1/2014 | Koch et al. | 475/276 |
| 2014/0038766 | A1 * | 2/2014 | Koch et al. | 475/276 |

* cited by examiner

*Primary Examiner* — Edwin A Young
(74) *Attorney, Agent, or Firm* — Miller Matthias & Hull

(57) ABSTRACT

A compact five-speed transmission planetary gear train includes a first, second, third, fourth and fifth planetary gear sets between an input and an output as well as first, second, third and fourth brakes and first and second clutches. The first, second, third and fourth brakes and first and second clutches are selectively actuatable to provide five different forward speeds and a plurality of different reverse speeds between the input and the output.

20 Claims, 12 Drawing Sheets

|       |      | Clutches  |           | Brakes    |            |           |            |
|-------|------|-----------|-----------|-----------|------------|-----------|------------|
| Ratio | Gear | First (50)| Second (51)| Third (48)| Fourth (49)| First (46)| Second (47)|
| 4.262 | 1F   | X         |           |           | X          | X         |            |
| 3.214 | 2F   | X         | X         |           |            | X         |            |
| 2.389 | 3F   | X         |           | X         |            | X         |            |
| 1.779 | 4F   |           | X         | X         |            | X         |            |
| 1.005 | 5F   |           |           | X         | X          | X         |            |
| -2.412| 1R   | X         | X         |           |            |           | X          |
| -1.793| 2R   | X         |           | X         |            |           | X          |
| -1.335| 3R   |           | X         | X         |            |           | X          |
| -.754 | 4R   |           |           | X         | X          |           | X          |

FIG. 3

CONFIGURATION FOR COMPACT FIVE SPEED PLANETARY TRANSMISSION

TECHNICAL FIELD OF THE DISCLOSURE

The present disclosure relates to mechanical power transmission and, more particularly, relates to a compact and efficient 5-forward/4-reverse transmission.

BACKGROUND OF THE DISCLOSURE

Because most power sources have a limited range of output RPM, machines employing such power sources will also typically employ a multispeed transmission to provide a greater range of machine speed. One type of multispeed transmission is the planetary transmission. Such a transmission generally includes many planetary gear sets linked together in various ways, with selectable elements used to select the input/output ratio.

However, planetary gear sets take up a significant amount of space, and it is typically required to either settle for a limited number of gear ranges or allow for a greater installation footprint to include a greater number of planetary gear sets. For example, U.S. Pat. No. 8,105,198 to Hart et al. compromises in the former manner. The Hart patent describes a compact transmission that includes four planetary gear sets and various clutches and brakes. The clutches and brakes are selectively engageable to provide different speed ratios, but only a single reverse speed ratio is enabled. In other words, while a wide variety of forward speeds is provided, the operator has no choice regarding reverse speeds since only a single reverse ratio is provided by the system.

The present disclosure is directed to a system that addresses one or more of the problems set forth above. However, it should be appreciated that the solution of any particular problem is not a limitation on the scope of this disclosure nor of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a machine power transmission is provided comprising a planetary gear train having only five planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, a fourth planetary gear set having a fourth sun gear, fourth ring gear, and fourth carrier, and a fifth planetary gear set having a fifth sun gear, fifth ring gear, and fifth carrier. The transmission includes an input to the planetary gear train and an output from the planetary gear train. Also included are a first brake, second brake, third brake, fourth brake, first clutch and second clutch associated with the planetary gear train, the first brake, second brake, third brake, fourth brake, first clutch and second clutch being linked to the planetary gear train such that selective actuation of one or more of the first brake, second brake, third brake, fourth brake, first clutch and second clutch provides five forward speeds and four or more reverse speeds. The first brake is positioned to brake the first carrier, the second brake is positioned to brake the second ring gear, the third brake is positioned to brake the fifth ring gear, the fourth brake is positioned to brake the fifth sun gear, the first clutch is positioned to tie the fourth sun gear to the fifth sun gear, and the second clutch is positioned to tie the fifth sun gear to the output from the planetary gear train.

In accordance with yet another aspect of the present disclosure, a planetary gear train is provided having first, second, third, fourth and fifth planetary gear sets between an input and an output. The first, second, third and fourth brakes and first and second clutches, the first, second, third and fourth brakes and first and second clutches are selectively actuatable to provide five different forward speeds and four different reverse speeds between the input and the output. The first brake is positioned to brake a first carrier of the first planetary gear set, the second brake is positioned to brake a second ring gear of the second planetary gear set, the third brake is positioned to brake a fifth ring gear of the fifth planetary gear set, the fourth brake is positioned to brake a fifth sun gear of the fifth planetary gear set, the first clutch is positioned to tie a fourth sun gear of the fourth planetary gear set to the fifth sun gear, and the second clutch is positioned to tie the fifth sun gear to the output from the planetary gear train.

In yet another aspect of the present disclosure, a compact transmission is provided having five forward speeds and four reverse speeds, the compact transmission including five or fewer planetary gear sets, four or fewer brakes for braking one or more elements of the planetary gear sets, and two or fewer clutches. Two of the brakes are activated on a mutually exclusive basis to select a transmission direction and all others of the brakes and clutches are activated in a least one forward speed and at least one reverse speed.

Other features and advantages of the disclosed systems and principles will become apparent from reading the following detailed disclosure in conjunction with the included drawing figures.

BRIEF DESCRIPTION OF THE DRAWINGS

FIG. 3 is a gear ratio chart showing ratios as well as clutch and brake activation patterns for each gear in accordance with the transmission of FIG. 2;

DETAILED DESCRIPTION OF THE DISCLOSURE

The present disclosure provides a configuration for a compact five-speed planetary transmission. The transmission in an embodiment includes five planetary gear sets configured via four static clutches (also referred to herein as brakes) and two rotating clutches. In an embodiment, these elements are located such that selective activation provides five forward speeds as well as four or more reverse speeds. In a further embodiment, the gear system is divided and includes distinct directional and speed portions.

Figure 1:
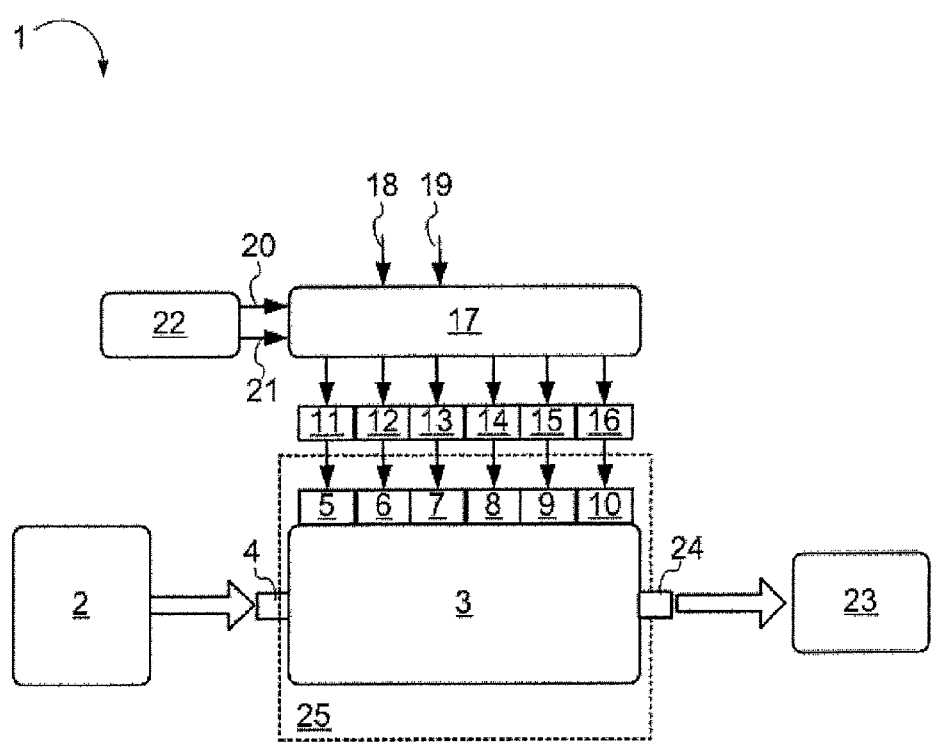
FIG. 1 is a schematic diagram of a transmission system and associated systems in keeping with an embodiment of the described principles.

Having discussed various embodiments in overview, we turn now to detailed descriptions of certain embodiments. FIG. 1 is a system schematic showing input, output, and control structures of a machine power system 1 in accordance with an embodiment. In the illustrated configuration, the machine power system 1 includes a power input device 2, which may be an engine such as a fuel-burning engine (gas, diesel, propane, LNG, kerosene, etc.) or a motor, e.g., an electric or hydraulic motor.

The power input device 2 is linked into a planetary gear set 3 via an input shaft 4. The state of the planetary gear set 3 (e.g., the output speed and direction of the planetary gear set 3) is controlled by a first brake 5, second brake 6, third brake 7, and fourth brake 8, as well as a first clutch 9 and second clutch 10. The planetary gear set 3, first brake 5, second brake 6, third brake 7, fourth brake 8, first clutch 9 and second clutch 10 may be referred to collectively as the transmission 25.

Each brake and clutch is controlled by a control element such as an electronic solenoid valve, such that the machine power system 1 includes a first solenoid 11, second solenoid 12, third solenoid 13, fourth solenoid 14, fifth solenoid 15 and sixth solenoid 16 linked to the first brake 5, second brake 6, third brake 7, fourth brake 8, first clutch 9 and second clutch 10 respectively.

A controller 17 is connected and configured to control each of the first solenoid 11, second solenoid 12, third solenoid 13, fourth solenoid 14, fifth solenoid 15 and sixth solenoid 16. In an embodiment, the controller 17 actuates the solenoids to set the state of the planetary gear set 3 in response to a plurality of inputs. In the illustrated embodiment, the plurality of inputs includes a speed input 18 from the power input device 2, and the controller 17 may also provide an acceleration output 19 to the power input device. The plurality of inputs further includes an acceleration input 20 and a direction input 21, both from a user interface module 22.

The user interface module 22 may be an interface to personnel in a machine cab or may be an interface to another electronic system, e.g., for remote control or autonomous operation. The controller 17 in an embodiment is a digital processor operating in accordance with computer-executable instructions and data read from one or more non-transitory computer-readable media, e.g., a volatile or nonvolatile memory associated with controller 17. The volatile or nonvolatile memory associated with controller 17 may include a flash drive, optical drive, magnetic drive and/or other appropriate memory device.

The planetary gear set 3 provides power to a final drive 23 via an output shaft 24, with the speed range and direction of the rotation of the output shaft 24 being set by the controller 17 via setting of the first solenoid 11, second solenoid 12, third solenoid 13, fourth solenoid 14, fifth solenoid 15 and sixth solenoid 16.

Figure 2:
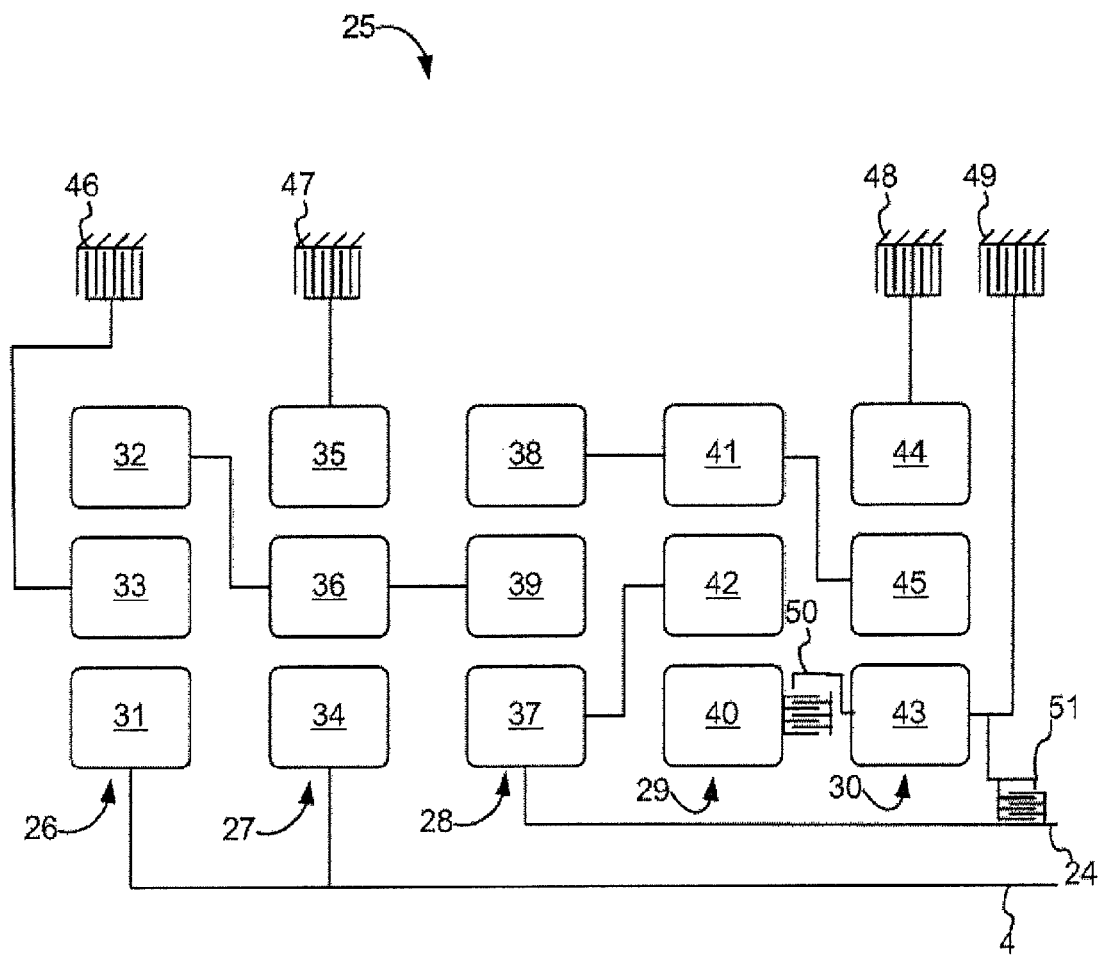
FIG. 2 is a planetary gear set diagram showing a transmission system in accordance with an embodiment of the described principles.

As will be seen from FIG. 2, the illustrated transmission 25 is implemented in an embodiment as a compact planetary gear system having five individual interconnected planetary gear sets. In particular, the transmission 25 as illustrated includes a first planetary gear set 26, a second planetary gear set 27, a third planetary gear set 28, a fourth planetary gear set 29, and a fifth planetary gear set 30. Each planetary gear set includes a sun gear, ring gear and carrier.

Thus, the first planetary gear set 26 comprises a first sun gear 31, a first ring gear 32, and a first carrier 33; the second planetary gear set 27 includes a second sun gear 34, a second ring gear 35, and a second carrier 36; the third planetary gear set 28 includes a third sun gear 37, a third ring gear 38, and a third carrier 39; the fourth planetary gear set 29 includes a fourth sun gear 40, a fourth ring gear 41, and a fourth carrier 42; and the fifth planetary gear set 30 includes a fifth sun gear 43, a fifth ring gear 44, and a fifth carrier 45.

In an embodiment, the first ring gear 32 is tied to the second carrier 36, which is in turn tied to the third carrier. Similarly, the first sun gear 31 and second sun gear 34 are tied to the transmission input 4. The third sun gear 37 is tied to the transmission output 24 and to the fourth carrier 42. The third ring gear 38 is tied to the fourth ring gear 41, which is in turn tied to the fifth carrier 45.

As noted above, the transmission 25 in an embodiment also includes a plurality of brakes and clutches. In the illustrated configuration, a first brake 46 is linked to the first carrier 33 of the first planetary gear set 26, a second brake 47 is linked to the second ring gear 35 of the second planetary gear set 27, a third brake 48 is linked to the fifth ring gear 44 of the fifth planetary gear set 30, and a fourth brake 49 is linked to the fifth sun gear 43 of the fifth planetary gear set 30. Each brake 46, 47, 48, 49 is configured to selectively tie the associated component to the transmission case or other static structure and thus limit the rotation of the associated component.

Moreover, in the illustrated configuration, a first clutch 50 is linked to the fourth ring gear 41 of the fourth planetary gear set 29, and a second clutch 51 is linked to the fifth sun gear 43 of the fifth planetary gear set 30. The first clutch 50 is selectively actuatable to link the fourth ring gear 41 of the fourth planetary gear set 29 to the fifth sun gear 43 of the fifth planetary gear set 30 and the fifth carrier 45 of the fifth planetary gear set 30. The second clutch 51 is selectively actuatable to link the fifth sun gear 43 of the fifth planetary gear set 30 to the third sun gear 37 of third planetary gear set 28, which is also linked to the output shaft 24.

In operation, selective actuation of one or more of the first brake 46, second brake 47, third brake 48, fourth brake 49, first clutch 50, and second clutch 51 serves to place the transmission 25 into a selected state, e.g., one of five forward speeds or one of four reverse speeds. The chart 55 of FIG. 3 shows the corresponding states for selective actuation in the illustrated embodiment.

As can be seen, the first brake 46 and the second brake 47 act effectively as directional selectors and are actuated on a mutually exclusive basis to select either a forward or a reverse output direction. The third brake 48, fourth brake 49, first clutch 50, and second clutch 51 are actuated in various patterns to select a gear ratio within the selected directional constraint.

In the illustrated embodiment, the following associations of [Ratio, Gear, First Clutch, Second Clutch, Third Brake, Fourth Brake, First Brake, Second Brake] respectively are exhibited: [4.262, 1F, On, Off, Off, On, On, Off]; [3.214, 2F, On, On, Off, Off, On, Off]; [2.389, 3F, On, Off, On, Off, On, Off]; [1.779, 4F, Off, On, On, Off, On, Off]; [1.005, 5F, Off, Off, On, On, On, Off]; [−2.412, 1R, On, On, Off, Off, Off, On]; [−1.793, 2R, On, Off, On, Off, Off, On]; [−1.335, 3R, Off, On, On, Off, Off, On]; and [−0.754, 4R, Off, Off, On, On, Off, On].

It will be appreciated that the power flow through the transmission 25 depends upon the selected direction and ratio. Thus, for each selectable gear 1F, 2F, 3F, 4F, 5F, 1R, 2R, 3R, and 4R, the power flow through the transmission 25 is shown in respective ones of the power flow diagrams included in FIGS. 4-12.

Figure 4:
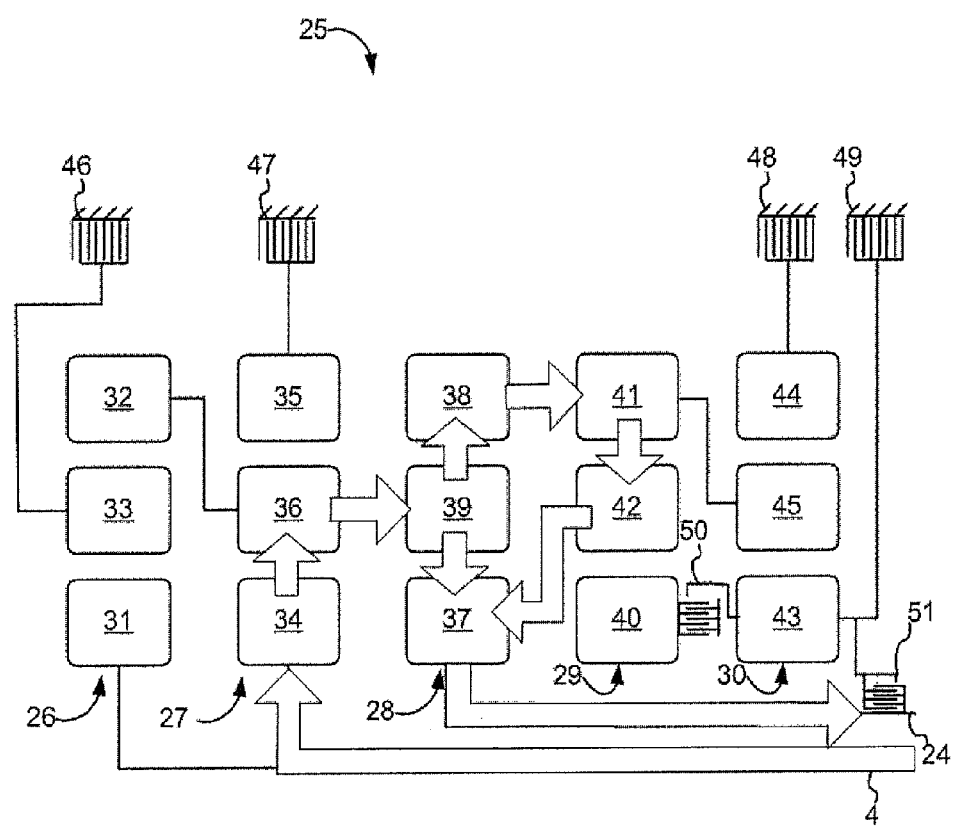
FIG. 4 is a power flow diagram showing the power flow in the transmission of FIG. 2 in a 1 F configuration.

FIG. 4 thus shows the power flow through the transmission 25 when the transmission is in the 1F state (first forward gear). The states of the [First Clutch, Second Clutch, Third Brake, Fourth Brake, First Brake, Second Brake] respectively are [On, Off, Off, On, On, Off] in this configuration.

Figure 5:
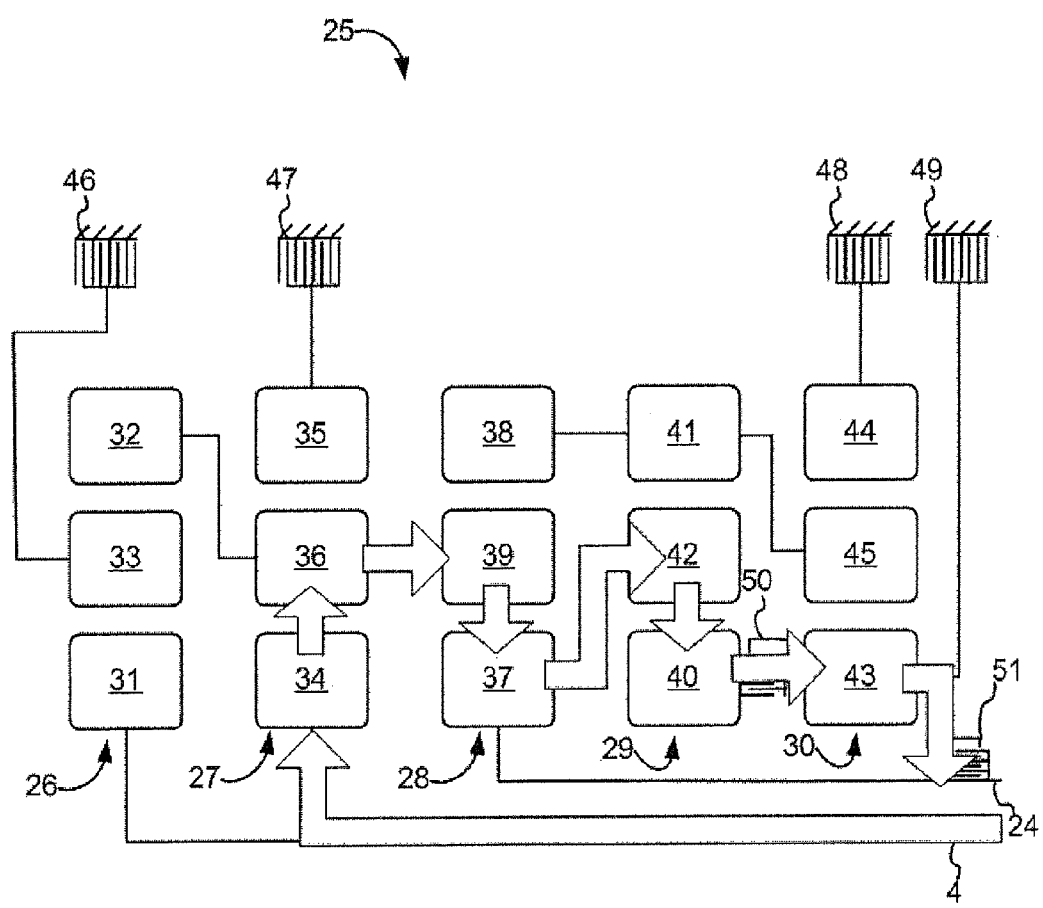
FIG. 5 is a power flow diagram showing the power flow in the transmission of FIG. 2 in a 2F configuration.

FIG. 5 shows the power flow through the transmission 25 when the transmission is in the 2F state (second forward gear). The states of the [First Clutch, Second Clutch, Third Brake, Fourth Brake, First Brake, Second Brake] in this configuration are [On, On, Off, Off, On, Off] respectively.

Figure 6:
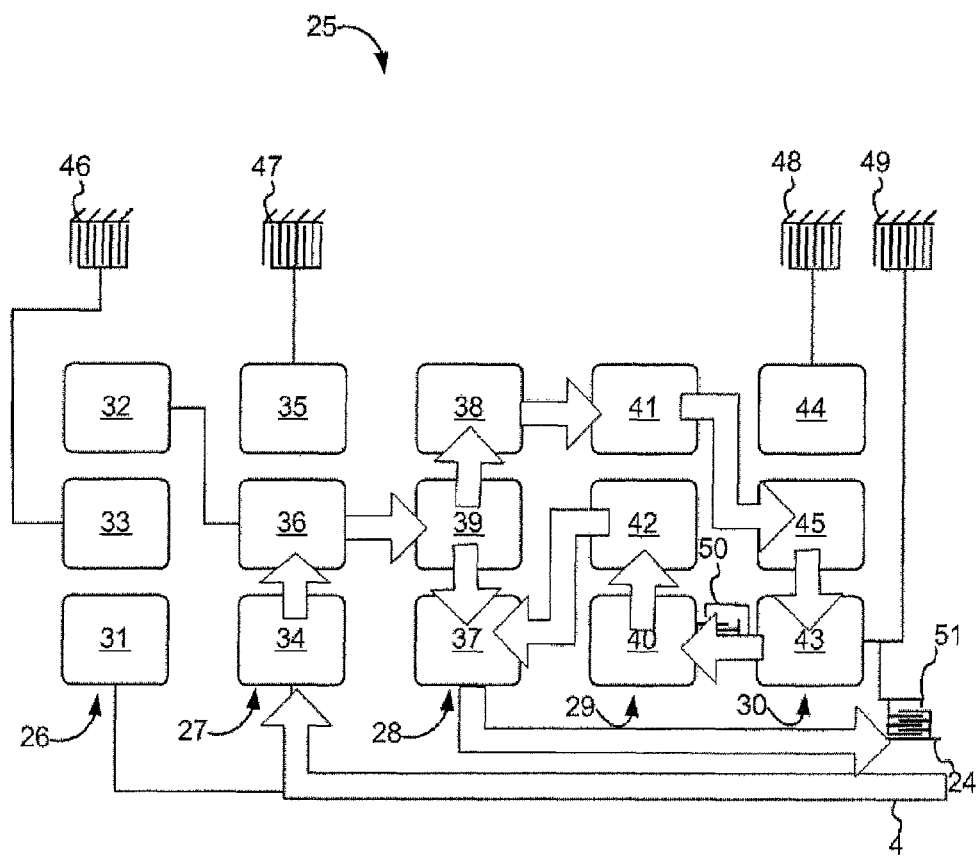
FIG. 6 is a power flow diagram showing the power flow in the transmission of FIG. 2 in a 3F configuration.

Shown in FIG. 6 is the power flow through the transmission 25 when the transmission is in the 3F state (third forward gear). The states of the [First Clutch, Second Clutch, Third Brake, Fourth Brake, First Brake, Second Brake] in this state are [On, Off, On, Off, On, Off] respectively.

Figure 7:
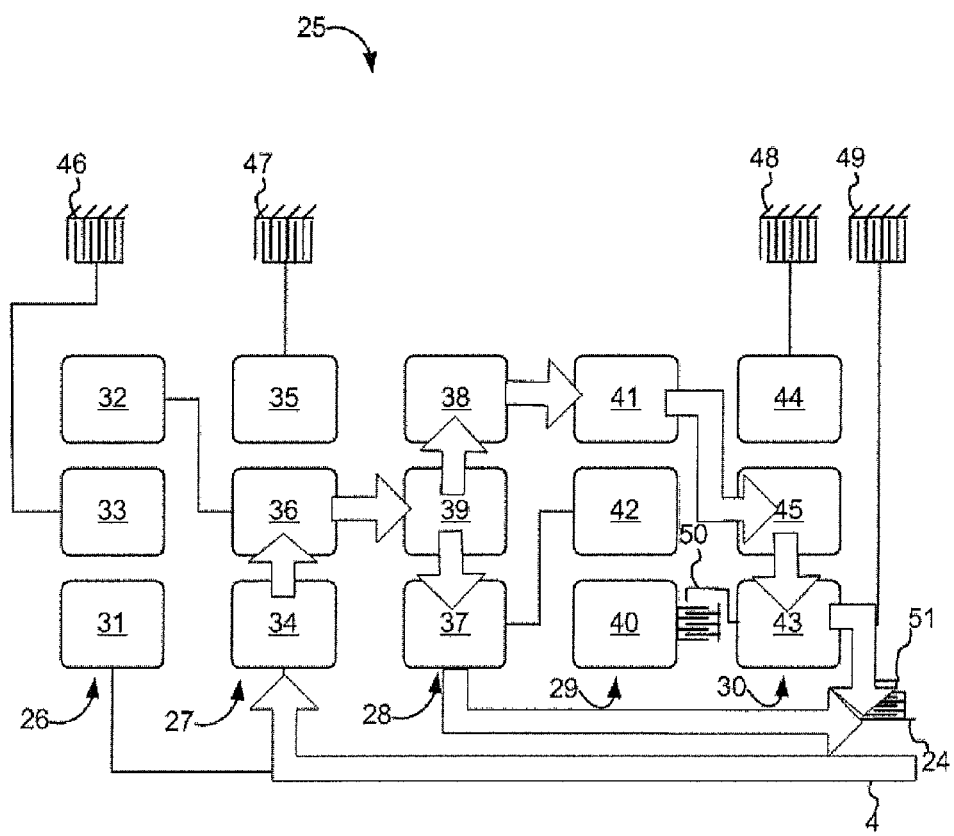
FIG. 7 is a power flow diagram showing the power flow in the transmission of FIG. 2 in a 4F configuration.

The power flow diagram of FIG. 7 illustrates the power flow through the transmission 25 when the transmission is in the 4F state (fourth forward gear). The states of the [First Clutch, Second Clutch, Third Brake, Fourth Brake, First Brake, Second Brake] in this state are [Off, On, On, Off, On, Off] respectively.

Figure 8:
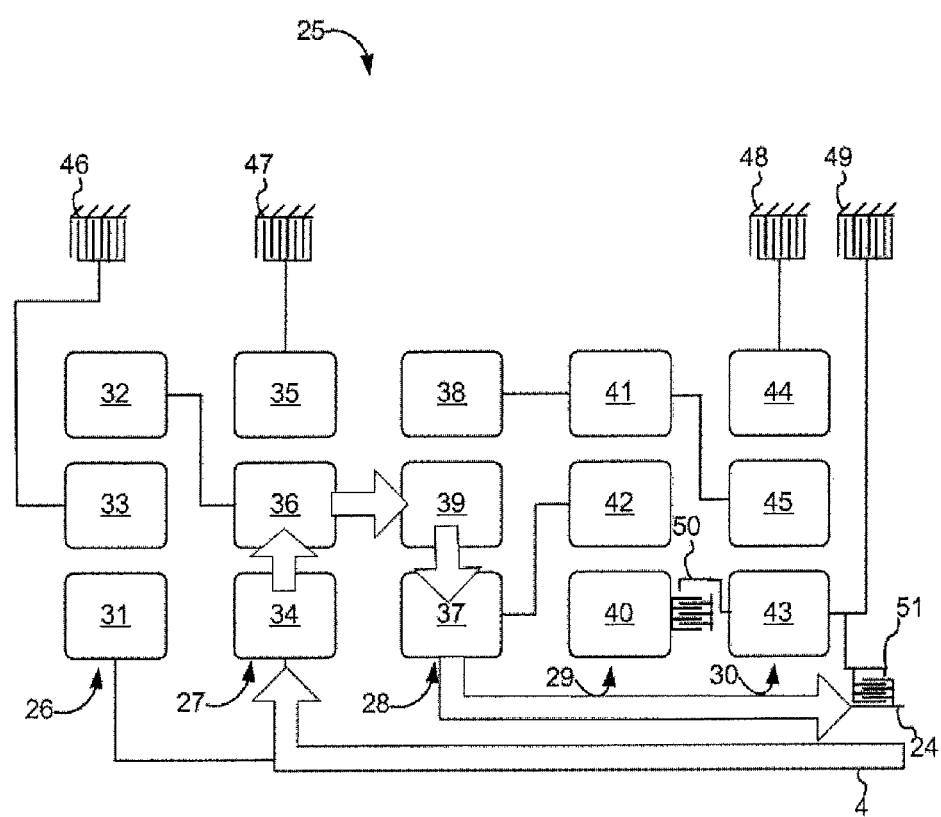
FIG. 8 is a power flow diagram showing the power flow in the transmission of FIG. 2 in a 5F configuration.

For the final forward state, 5F, FIG. 8 shows the power flow through the transmission 25. The states of the [First Clutch, Second Clutch, Third Brake, Fourth Brake, First Brake, Second Brake] in this state are [Off, Off, On, On, On, Off] respectively.

Figure 9:
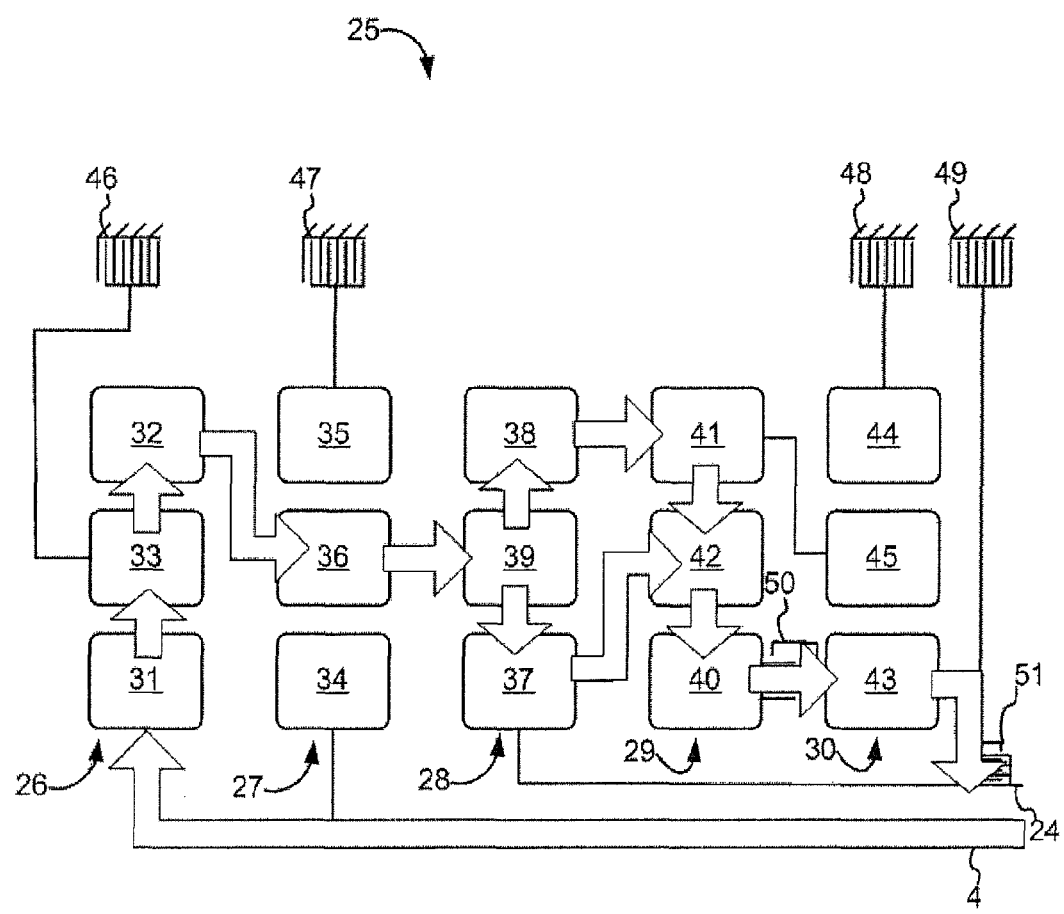
FIG. 9 is a power flow diagram showing the power flow in the transmission of FIG. 2 in a 1R configuration.

Having reviewed the power flow in each of the forward gears, the power flow in each reverse gear will be shown. FIG. 9 illustrates the power flow through the transmission 25 when the transmission is in the 1R state (first reverse gear). The states of the [First Clutch, Second Clutch, Third Brake, Fourth Brake, First Brake, Second Brake] in this state are [On, On, Off, Off, Off, On] respectively.

Figure 10:
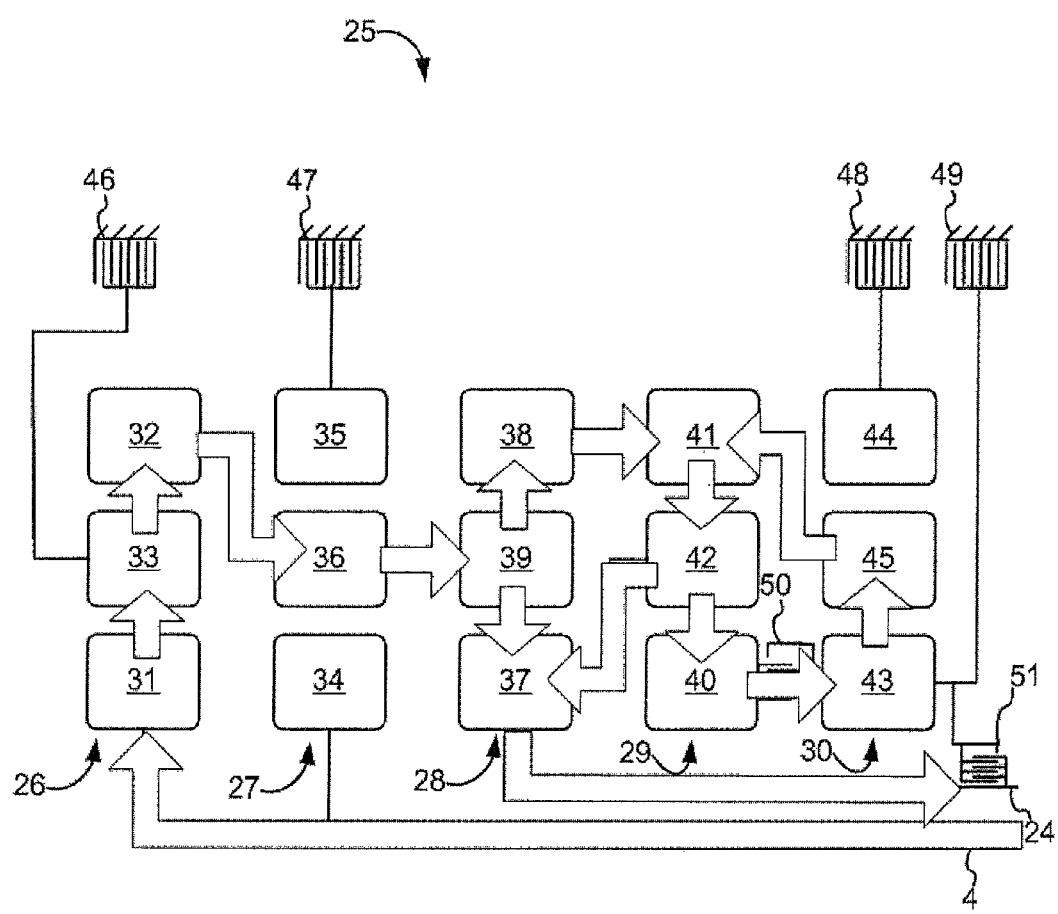
FIG. 10 is a power flow diagram showing the power flow in the transmission of FIG. 2 in a 2R configuration.

The power flow through the transmission 25 when the transmission is in the 2R state (second reverse gear) is shown in FIG. 10. The states of the [First Clutch, Second Clutch, Third Brake, Fourth Brake, First Brake, Second Brake] in this configuration are [On, Off, On, Off, Off, On] respectively.

Figure 11:
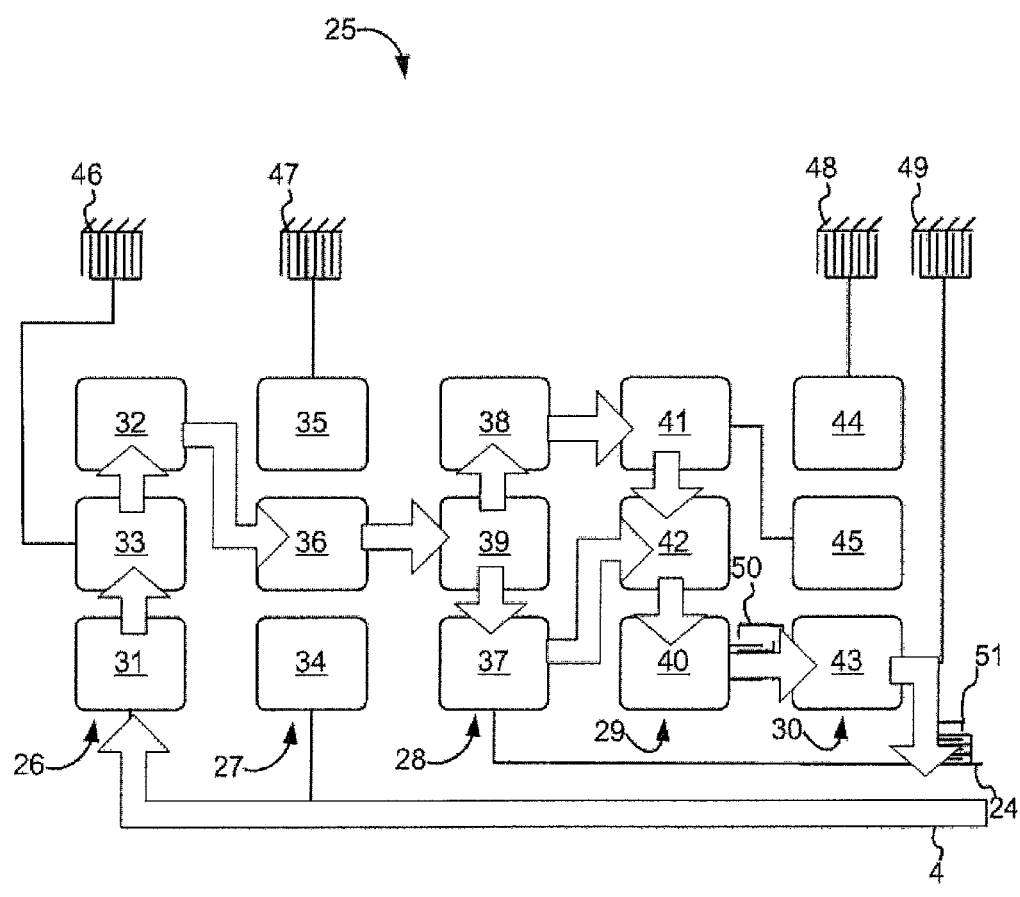
FIG. 11 is a power flow diagram showing the power flow in the transmission of FIG. 2 in a 3R configuration.

In the 3R state (third reverse gear), all five planetary gear sets are again involved in the power flow as shown in FIG. 11. In this state, the configurations of the [First Clutch, Second Clutch, Third Brake, Fourth Brake, First Brake, Second Brake] are [Off, On, On, Off, Off, On] respectively.

Figure 12:
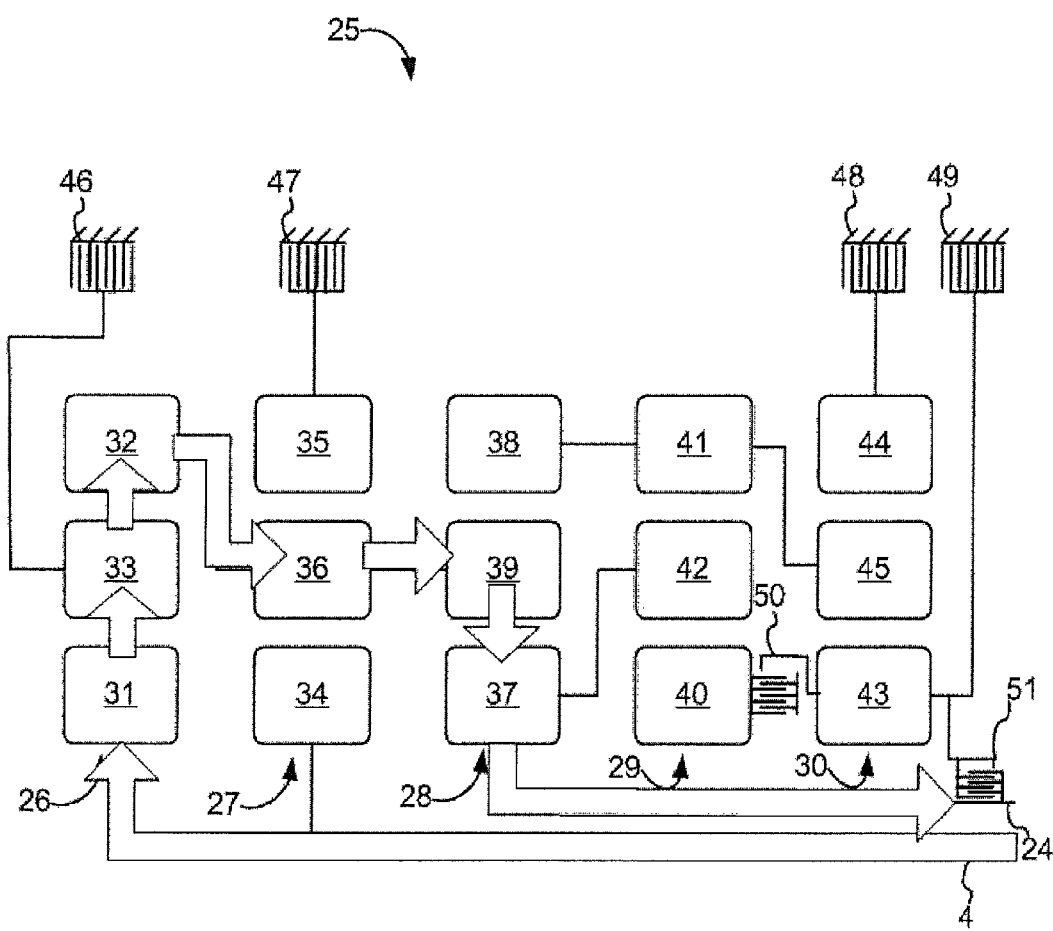
FIG. 12 is a power flow diagram showing the power flow in the transmission of FIG. 2 in a 4R configuration.

The power flow through the transmission 25 in the final reverse state 4R (fourth reverse gear) is shown in the power flow diagram of FIG. 12. In this state, the configurations of the [First Clutch, Second Clutch, Third Brake, Fourth Brake, First Brake, Second Brake] are [Off, Off, On, On, Off, On] respectively.

It will be appreciated that the precise input/output ratio in each state will depend upon the e-value of each planetary gear set. In the embodiment reflected in the state chart of FIG. 3, the e-value for the first planetary gear set is 2.412, the e-value for the second planetary gear set is 2.214, the e-value for the third planetary gear set is 2.199, the e-value for the fourth planetary gear set is 2.108, and the e-value for the fifth planetary gear set is 1.854. Those of skill in the art will understand that other planetary gear set e-values may be used to change one or more of the gear ratios shown in FIG. 3. Moreover, it will be appreciated that the described principles include any trivial variants.

INDUSTRIAL APPLICABILITY

In general terms, the present disclosure sets forth a compact 5-forward/4-reverse transmission applicable to any machine wherein a compact space requirement exists and the indicated number and direction of gears are needed. The described system operates by the selective actuation of four brakes and two rotational clutches. The system is divided in the sense that two brakes on two adjacent planetary gear sets serve as directional selectors, and the two adjacent planetary gear sets are tied into the remaining planetary gear sets via a single link. The resultant system provides compact installation and efficient operation. In addition, the close step of the resultant system allows direct drive shifts in the working range.

It will be appreciated that the present disclosure provides a new and useful transmission for use in a variety of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A machine power transmission comprising:
a planetary gear train having only five planetary gear sets including a first planetary gear set having a first sun gear, first ring gear, and first carrier, a second planetary gear set having a second sun gear, second ring gear, and second carrier, a third planetary gear set having a third sun gear, third ring gear, and third carrier, a fourth planetary gear set having a fourth sun gear, fourth ring gear, and fourth carrier, and a fifth planetary gear set having a fifth sun gear, fifth ring gear, and fifth carrier;
an input to the planetary gear train and an output from the planetary gear train; and
a first brake, second brake, third brake, fourth brake, first clutch and second clutch associated with the planetary gear train, the first brake, second brake, third brake, fourth brake, first clutch and second clutch being linked to the planetary gear train such that selective actuation of one or more of the first brake, second brake, third brake, fourth brake, first clutch and second clutch provides five forward speeds and four or more reverse speeds, the first brake being positioned to brake the first carrier, the second brake being positioned to brake the second ring gear, the third brake being positioned to brake the fifth ring gear, the fourth brake being positioned to brake the fifth sun gear, the first clutch being positioned to tie the fourth sun gear to the fifth sun gear, and the second clutch being positioned to tie the fifth sun gear to the output from the planetary gear train.

2. The machine power transmission in accordance with claim 1, wherein the transmission is divided into a directional portion of the transmission and a speed portion of the transmission.

3. The machine power transmission in accordance with claim 2, wherein the directional portion of the transmission includes the first and second planetary gear sets.

4. The machine power transmission in accordance with claim 1,
wherein a first forward speed is provided by actuation of the first clutch, first brake, and fourth brake.

5. The machine power transmission in accordance with claim 1,
wherein a second forward speed is provided by actuation of the first clutch, second clutch, and first brake.

6. The machine power transmission in accordance with claim 1,
wherein a third forward speed is provided by actuation of the first clutch, first brake, and third brake.

7. The machine power transmission in accordance with claim 1,
wherein a fourth forward speed is provided by actuation of the second clutch, first brake, and third brake.

8. The machine power transmission in accordance with claim 1,
wherein a fifth forward speed is provided by actuation of the first brake, third brake, and fourth brake.

9. The machine power transmission in accordance with claim 1,
wherein a plurality of reverse speeds are provided by actuation of the second brake in combination with one or more of the first and second clutches and the third and fourth brakes.

10. A planetary gear train comprising:
first, second, third, fourth and fifth planetary gear sets between an input and an output; and
first, second, third and fourth brakes and first and second clutches, the first, second, third and fourth brakes and first and second clutches being selectively actuatable to provide five different forward speeds and four different reverse speeds between the input and the output, the first brake being positioned to brake a first carrier of the first planetary gear set, the second brake being positioned to brake a second ring gear of the second planetary gear set, the third brake being positioned to brake a fifth ring gear of the fifth planetary gear set, the fourth brake being positioned to brake a fifth sun gear of the fifth planetary gear set, the first clutch being positioned to tie a fourth sun gear of the fourth planetary gear set to the fifth sun gear, and the second clutch being positioned to tie the fifth sun gear to the output from the planetary gear train.

11. The planetary gear train in accordance with claim 10, wherein the first, second, third, fourth and fifth planetary gear sets are divided into a directional portion and a speed portion.

12. The planetary gear train in accordance with claim 11, wherein the directional portion includes the first and second planetary gear sets.

13. The planetary gear train in accordance with claim 12, wherein the first brake and second brake are activated on a mutually exclusive basis to select a transmission direction.

14. The planetary gear train in accordance with claim 13, wherein a plurality of reverse speeds are provided by activation of the second brake in combination with one or more of the first clutch, second clutch, third brake, and fourth brake.

15. The planetary gear train in accordance with claim 13, wherein a plurality of forward speeds are provided by activation of the first brake in combination with one or more of the first clutch, second clutch, third brake, and fourth brake.

16. The planetary gear train in accordance with claim 13, further including an electrically actuatable solenoid associated with each of the first clutch, second clutch, first brake, second brake, third brake, and fourth brake for activation thereof.

17. The planetary gear train in accordance with claim 16, further including an electronic controller linked to each electrically actuatable solenoid.

18. The planetary gear train in accordance with claim 17, further including a user interface module linked to the electronic controller for receiving user commands.

19. The planetary gear train in accordance with claim 13, wherein the input is linked to a power input device.

20. A compact transmission providing five forward speeds and four reverse speeds, the compact transmission including five planetary gear sets, four brakes for braking one or more elements of the planetary gear sets, and two clutches, wherein two of the brakes are activated on a mutually exclusive basis to select a transmission direction and wherein all others of the brakes and clutches are activated in at least one forward speed and at least one reverse speed.

* * * * *